May 26, 1936.     C. G. MUNTERS     2,042,355
REFRIGERATING SYSTEM
Filed July 23, 1932
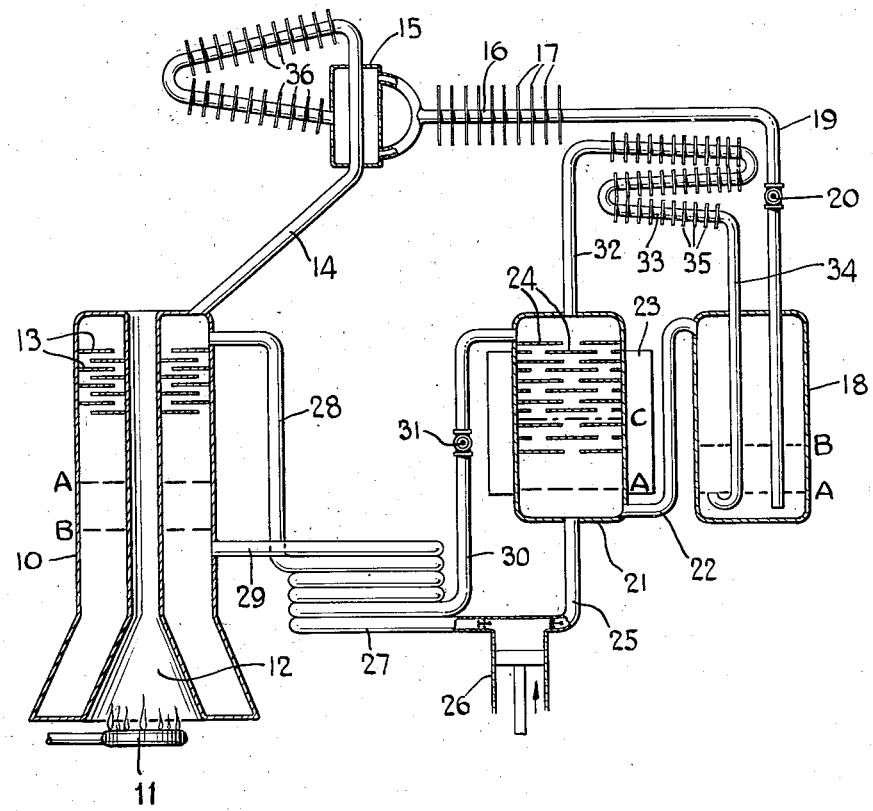
INVENTOR.
Carl Georg Munters
BY
ATTORNEY Patented May 26, 1936

2,042,355

UNITED STATES PATENT OFFICE 2,042,355

REFRIGERATING SYSTEM

Carl Georg Munters, Stockholm, Sweden, assignor, by mesne assignments, to Servel, Inc., Dover, Del., a corporation of Delaware Application July 23, 1932, Serial No. 624,223
In Germany August 1, 1931

12 Claims. (Cl. 62—178)

This invention relates to refrigeration and more particularly to a system for producing refrigeration by the evaporation of a plurality of refrigerants.

Absorption refrigerating systems have been proposed utilizing several refrigerants of which one is absorbed and then expelled from solution by heat and another is condensed without being dissolved in an absorption liquid. Such systems require the use of refrigerants which condense at approximately the same pressures and temperatures.

This invention contemplates a continuous absorption system of the two pressure type utilizing several refrigerants which condense at approximately the same temperatures but at different pressures, thereby greatly increasing the choice of refrigerants and making possible low refrigerating temperatures. A system in accordance with this invention is particularly applicable for large installations or commercial machines where low refrigerating temperatures may be required and operating personnel is available.

A further object of this invention is to provide such a refrigerating system which continues to produce refrigeration for an appreciable length of time after the operating means have been shut down.

Further objects and advantages will be apparent from the following description taken in connection with the accompanying drawing in which the figure shows schematically, with parts in vertical section, a system contemplated by this invention.

Referring to the drawing, a generator 10 adapted to contain a solution of refrigerant in an absorption liquid, such as ammonia in water, is heated by any suitable means, such as a gas burner 11 in the flue 12. The generator 10 as represented is of the vertical type with a plurality of baffles in its upper portion which forms an analyzer, as hereinafter described.

The top of the generator 10 communicates through conduit 14 and rectifier 15 with a condenser 16. This condenser is hereinafter referred to as the "ammonia" condenser and is suitably cooled by circulating cooling water or air. In the latter case the condenser is provided with heat radiating fins 17, as illustrated. The ammonia condenser 16 communicates with the lower part of the evaporator 18 through conduit 19 in which there is a pressure reducing valve 20. This valve may be operated manually or automatically in any of the several ways known in the art.

The upper part of the evaporator 18 communicates with the lower part of an absorber 21 through conduit 22. The absorber may be cooled in any well known manner and is shown provided with heat radiating fins 23 for air cooling. The interior of the absorber 21 is provided with a plurality of baffle plates 24 as well known in the art. The bottom of the absorber 21 is connected through conduit 25, pump 26, liquid heat exchanger 27, and conduit 28 to the upper part of the generator 10. The lower part of the generator 10 is connected through conduit 29, liquid heat exchanger 27, and conduit 30 to the upper part of the absorber 21. A control valve 31 in conduit 30 may be operated manually or automatically in any manner known in the art, for instance, responsive to generator pressure or temperature.

The top of the absorber 21 is connected through conduit 32 to one end of a condenser 33, the other end of which communicates with the lower part of the evaporator 18 through conduit 34. The condenser 33 hereinafter referred to as the "butane" condenser may be cooled in any well known manner and is shown provided with heat radiating fins 35 for air cooling.

For the purpose of this description, water is used as the absorption liquid, ammonia as the soluble refrigerant, and isobutane as the insoluble refrigerant. When the generator 10 is heated, ammonia vapor is expelled from solution in the water and passes upwardly through conduit 14 and rectifier 15 to the ammonia condenser 16. Some ammonia condenses in the cooled portion 36 of conduit 14 and the liquid accumulates in the rectifier 15 which is thus maintained at such a temperature that water vapor which may pass upwardly through conduit 14 with the ammonia vapor is condensed out and drains back to the generator through conduit 14.

Liquid ammonia from the condenser 16 flows through conduit 19 and the pressure reducing valve 20 into the lower part of the evaporator 18. The latter is also supplied with liquid isobutane from condenser 33 as hereinafter described. In the evaporator, both the ammonia and isobutane evaporate and the resulting gas mixture flows through conduit 22 into the absorber 21.

It is apparent that a pressure difference between the generator on one hand and the absorber and evaporator on the other is maintained by valve 20 in the ammonia line 19, valve 31 in the weak liquor line 30, and pump 26 in the strong liquor line 25. Due to this pressure difference when the generator 10 is heated, weak absorption liquid flows from the generator through conduit 29, liquid heat exchanger 27, conduit 30, and control valve 31 into the upper part of the absorber 21 where it flows downwardly over the baffle plates 24 absorbing ammonia out of the gas mixture.

Enriched absorption liquid flows from the bottom of the absorber through conduit 25 and is forced by pump 26 through the liquid heat exchanger 27 and conduit 28 to the upper part of the generator 10 where it flows downwardly over baffle plates 13 in contact with and counterflow to the rising vapor expelled from solution in the generator whereby an analyzing effect is obtained to remove some of the water vapor from the ammonia.

Isobutane passes from the top of the absorber 21 into the condenser 33 which is maintained at such a temperature that, under absorber pressure, the isobutane liquefies and flows through conduit 34 into the evaporator 18.

It is preferable that conduit 34 be a tube of small diameter so that any ammonia which may enter the butane condenser 33 will be carried downwardly into the evaporator by the liquid isobutane. It will be understood that ammonia gas might also be vented from the discharge end of the butane condenser 33, as is well known in the art, into the ammonia line 19 on the side of the control valve 20 toward the evaporator 18.

At starting, the solution of ammonia and water may stand in the generator 10 and absorber 21, and isobutane in the evaporator 18, to the levels A. When the generator is heated, the liquid level therein falls say to the level B and due to the addition of ammonia in the evaporator 18, the liquid therein rises to some higher level B, but the liquid in the absorber 21 remains substantially at the level A. The liquid head in the absorber 21 above the connection of conduit 22 is balanced by corresponding liquid columns standing in the ammonia conduit 19 and isobutane conduit 34 to the evaporator 18.

When the gas burner 11 and pump 26 are shut down, the valve 20 in the ammonia line should be closed. Obviously a separate automatic shut-off valve could be provided in this line to the same end. The pressure in the generator continues to force liquid through conduit 29, heat exchanger 27, and conduit 30 into the absorber until the liquid therein rises to some level C. Thus the amount of liquid in the absorber is considerably increased during the shut down period. The two refrigerants in the evaporator 18 continue to evaporate and the ammonia is absorbed out of the gas mixture bubbling through the liquid in the absorber. The isobutane continues to circulate through the absorber, condenser 33, and evaporator 18 as long as evaporation takes place in the latter.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. The method of refrigerating which includes evaporating a plurality of liquid cooling fluids in the presence of each other, and separately condensing the resulting vapors at different pressures.

2. The method of refrigerating which includes evaporating a plurality of liquid cooling fluids in the presence of each other, dissolving one of said fluids out of the resulting gas mixture, expelling said fluid as vapor from solution, liquefying the expelled vapor under certain temperature and pressure conditions, liquefying another of said fluids at a different pressure, and again evaporating the liquids in the presence of each other.

3. The method of refrigerating which includes passing a plurality of fluids through their respective evaporating-condensing cycles, said fluids being in the presence of each other during the evaporating portions of the cycles and under different pressures during the condensing portions of the cycles.

4. The method of refrigerating which includes passing a first fluid through an evaporating-absorbing-generating-condensing cycle, and a second fluid through an evaporating-condensing cycle, said fluids being in the presence of each other during the evaporating portions of the cycles and under substantially the same temperature conditions but at different pressures during the condensing portions of the cycles.

5. The method of refrigerating which includes evaporating ammonia and isobutane in the presence of each other, absorbing the ammonia out of the resulting gas mixture into a water solution, expelling the ammonia as vapor from solution, condensing the expelled ammonia under certain temperature and pressure conditions, condensing the vaporous isobutane at a different pressure, and again evaporating the condensed fluids in the presence of each other.

6. A refrigerating system including a generator, a condenser, an evaporator, and an absorber forming a circuit for a cooling fluid, a pressure reducing control valve in said circuit between said condenser and evaporator, means for controlling the circulation of absorption liquid between said generator and absorber and maintaining a pressure difference therebetween, and an auxiliary circuit for a second cooling fluid comprising said evaporator, said absorber, and a second condenser through which a second cooling fluid passes from the absorber to the evaporator.

7. A refrigerating system including a generator, an absorber, means for circulating absorption liquid from said generator through said absorber and maintaining a pressure difference therebetween, an evaporator connected to discharge gas into said absorber, a first condenser connected to receive vapor from said generator and discharge liquid into said evaporator, pressure reducing means between said condenser and evaporator, and a second condenser connected to receive vapor from said absorber and discharge liquid into said evaporator.

8. A refrigerating system including a generator, an absorber, a conduit for weak absorption liquid from said generator to said absorber, a control valve in said conduit, means for transferring enriched absorption liquid from a region of low pressure to a region of high pressure in a path of flow from the absorber to the generator, an evaporator, a conduit for gas from said evaporator to the absorber, a first condenser connected between said generator and evaporator, a pressure reducing valve in the connection between said condenser and evaporator, and a second condenser connected between and in unrestricted fluid communication with both said absorber and evaporator.

9. A refrigerating system including a first circuit for cooling fluid having a high pressure portion including a generator and a condenser, and a low pressure portion including an evaporator and an absorber, and a second condenser connected between said absorber and evaporator to form therewith a circuit for a second cooling fluid.

10. A refrigerating system including a generator, a condenser, and an evaporator, an absorber connected to form a path of flow for a cooling fluid, pressure reducing means in said path of flow between said condenser and evaporator, a second condenser orbitly connected in unrestricted fluid communication with said absorber and evaporator to form a circuit for a second cooling fluid, a conduit for weak absorption liquid from said generator to said absorber, a control valve in said conduit, and a pump connected to return enriched absorption liquid from the absorber to the generator.

11. A refrigerating system including a generator, an absorber, a conduit for weak absorption liquid from said generator to said absorber, a control valve in said conduit, means for transferring enriched absorption liquid from a region of low pressure to a region of high pressure in a path of flow from the absorber to the generator, an evaporator, a conduit for gas from said evaporator to the absorber, a first condenser connected between said generator and evaporator, pressure reducing and shut-off means in the connection between said condenser and evaporator, and a second condenser connected between and in fully open fluid communication with both said absorber and evaporator.

12. A refrigerating system including a generator, heating means for said generator, an absorber, a conduit for weak absorption liquid from said generator to said absorber, a control valve in said conduit, a pump for returning enriched absorption liquid from the absorber to the generator, an evaporator, a conduit for gas from said evaporator to the absorber, a first condenser connected between said generator and evaporator, pressure reducing and shut-off means in the connection between said condenser and evaporator adapted to be closed when said pump and generator heating means are shut down, and a second condenser connected between and in fully open fluid communication with both said absorber and evaporator.

CARL GEORG MUNTERS.